Dec. 4, 1962  A. PACE  3,066,683
DANDRUFF REMOVING COMB
Filed May 27, 1960
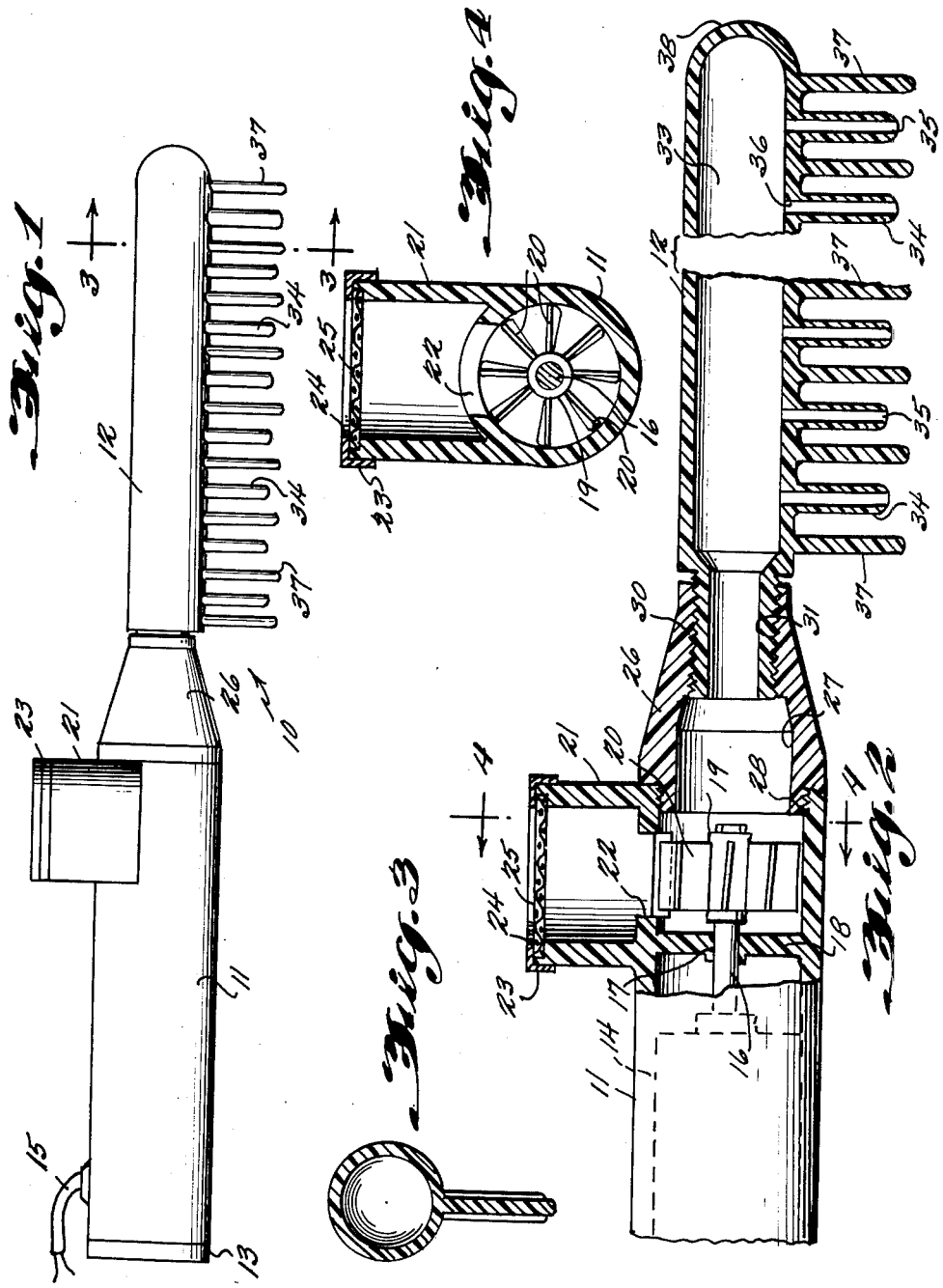
INVENTOR.
ANDRE PACE
BY
Kimmel & Crowell
ATTORNEYS

United States Patent Office 3,066,683
Patented Dec. 4, 1962

3,066,683
DANDRUFF REMOVING COMB
Andre Pace, 22—66 46th St., Queens, New York, N.Y.
Filed May 27, 1960, Ser. No. 32,197
1 Claim. (Cl. 132—11)

This invention relates to a dandruff removing comb, and more particularly, to a comb including alternate dandruff agitating teeth and tubular dandruff removing teeth, the latter opening into a collecting chamber from which the dandruff is removed by means of an electrically driven suction fan.

A primary object of the invention is the provision of an improved comb of this character wherein the longer teeth are provided to scratch the scalp for the purpose of agitating and dislodging the dandruff, while the shorter tubular teeth provide passageways for the removal of the loosened dandruff.

An additional object of the invention is the provision of such a device wherein the dandruff is effectually removed by means of a suction motor, to prevent loose dandruff from settling on the person of the user.

A further object of the invention is the provision of a device of this character provided with filter means whereby loose dandruff is retained in the comb, and not blown out into the ambient air.

Still another object of the invention is the provision of a device of this character wherein the arrangement of the teeth prevents clogging, particularly when used on oily scalps.

A further object of the invention is the provision of a device of this character which is sturdy and durable in construction, reliable and efficient in operation, and relatively simple and inexpensive to manufacture, assemble, and utilize.

Other objects will in part be obvious and in part be pointed out hereinafter and shown in the accompanying drawing wherein:

FIGURE 1 is a side elevational view of one form of dandruff removing comb embodying elements of the instant invention.

FIGURE 2 is an enlarged vertical sectional view taken substantially along the center line of FIG. 1, parts thereof being broken away.

FIGURE 3 is a sectional view taken substantially along the line 3—3 of FIG. 1 as viewed in the direction indicated by the arrows; and, FIGURE 4 is a sectional view taken substantially along the line 4—4 of FIG. 2 as viewed in the direction indicated by the arrows.

Similar reference characters refer to similar parts throughout the several views of the drawings.

Having reference now to the drawings in detail, the device of the instant invention is generally indicated at 10, and includes a handle portion 11, and a main body 12 of the comb. The handle portion 11 has an axial bore extending from its outer end, which is closed by a removable end cap 13. A pencil type electric motor 14 is positioned interiorly of the handle and supplied with current through a cable 15, although if desired the handle may be elongated to accommodate batteries.

Motor 14 is provided with a drive shaft 16, which extends through a suitable bearing 17 in an interiorly positioned sealing partition 18, and has secured thereto the hub 19 of a suction fan 20. In the side wall of handle member 11 and immediately adjacent the fan 20 there is provided with an enlarged boss 21, with an axial bore therethrough and an opening 22 in the bottom thereof communicating with the fan chamber. The boss 21 is provided with a removable snap-on cover 23, which has therein a central opening 24 having a suitable filter 25, of any desired conventional filtering material therein.

The forward end of handle portion 11 is provided with a tapered shank 26, which has an axial bore 27 therein, and an externally threaded end flange 28 which is adapted to cooperate with the threaded end 29 of handle member 11. The opposite end of the shank 26 is internally threaded as at 30, and is adapted to have secured thereto the externally threaded end portion 31 of handle 12.

The body portion 12 has therein an elongated relatively large interior tubular chamber 33, from the lower portion of which there protrudes a plurality of hollow tubular dandruff removing suction teeth 34. The teeth 34 have bores 35 along their axes, through which dandruff is adapted to be sucked, and openings 36 at their upper ends communicating with the chamber 33. Alternately positioned with the teeth 34 there are longer, relatively rigid, teeth 37. The rigid teeth 37 are for the purpose of scratching the scalp and dislodging the dandruff therefrom to a position where it may be readily sucked up by the draft through the bores 35 in the teeth 34. The length of the teeth 37 is only slightly in excess of that of the teeth 34, and is purposely exaggerated in the drawing for the purposes of illustration. The outer end of chamber 33 is closed by a semispherical end 38 of the main body 12.

From the foregoing the use and operation of the device should now be readily understandable. When the motor 14 is started the suction fan 20 rotates, and then as the comb is passed through the hair and over the scalp of the user, the relatively stiff teeth 37 serve to agitate and dislodge the dandruff on the scalp. At the same time, suction through the bores 35 in teeth 34 draws the dandruff into the tubular chamber 33, and thence outwardly through the opening 22 to be received in the axial bore of the boss 21, being retained therein by the filter 25.

Periodically, the cap 23 may be removed, and the contents of the chambers formed by the axial bore within the boss emptied. Similarly, by unscrewing the comb portion 12 from the shank member 26, any dandruff remaining in the chamber 33 may similarly be removed. Also the device may be suitably washed when in disassembled condition.

From the foregoing it will now be seen that there is herein provided an improved dandruff removing comb, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

A dandruff removing comb comprised by a handle having an axial bore extending from one end, a partition having an axial hole therein closing the inner end of said bore, a fan chamber beyond said bore and a radially positioned boss on said handle having an axial bore therein communicating with the fan chamber, a filter over the outer end of said latter bore, an electric motor positioned in the axial bore in the handle having a shaft rotatably received in the axial hole in the partition, a suction fan mounted on the shaft within the fan chamber, a shank received at one end in the other end of the handle having an axial bore therethrough communicating with the fan chamber, a comb body having an internal chamber therein secured in the other end of the shank with the internal chamber communicating with the axial bore through the shank, solid teeth spaced longitudinally along the comb body and alternate shorter teeth also spaced longitudinally along the comb body and having axial bores therein communicating with the internal chamber in the latter.

References Cited in the file of this patent

UNITED STATES PATENTS

| | | |
|---|---|---|
| 1,525,106 | Smythe | Feb. 3, 1925 |
| 1,686,936 | Simpson | Oct. 9, 1928 |
| 2,532,001 | Williams | Nov. 28, 1960 |

FOREIGN PATENTS

| | | |
|---|---|---|
| 467,609 | Germany | Oct. 27, 1928 |
| 667,947 | Great Britain | Mar. 12, 1952 |
| 989,624 | France | May 30, 1951 |